(No Model.)
W. F. SMITH, Jr., & G. C. SMITH.
CIGAR STUMP RECEPTACLE.
No. 439,309. Patented Oct. 28, 1890.
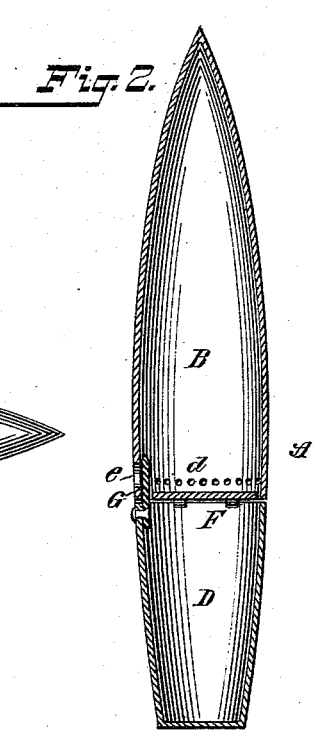
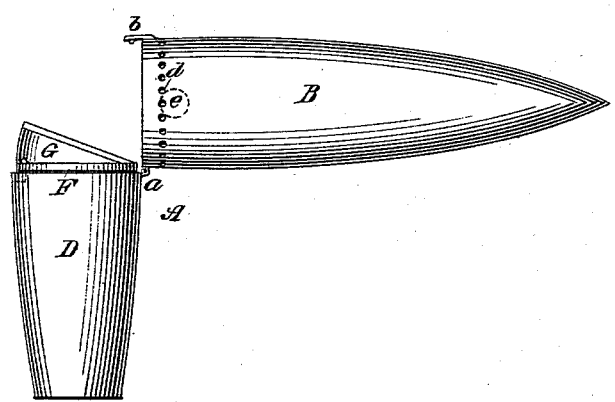
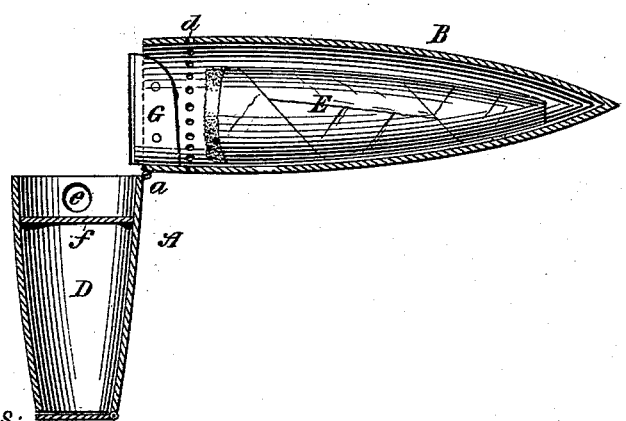
WITNESSES:
William Goebel
L. B. Morss
INVENTORS
William F. Smith Jr.
and
George C. Smith.
BY
T. F. Bourne
their ATTORNEY.

UNITED STATES PATENT OFFICE.

WILLIAM F. SMITH, JR., AND GEORGE C. SMITH, OF NEW YORK, N. Y., ASSIGNORS OF ONE-THIRD TO J. EDWARD COWLES, OF SAME PLACE.

CIGAR-STUMP RECEPTACLE.

SPECIFICATION forming part of Letters Patent No. 439,309, dated October 28, 1890.

Application filed November 21, 1889. Serial No. 331,103. (No model.)

*To all whom it may concern:*

Be it known that we, WILLIAM F. SMITH, Jr., and GEORGE C. SMITH, both residents of the city, county, and State of New York, have invented an Improvement in Cigar-Stump Receptacles, of which the following is a specification.

The object of our invention is to combine a cigar-cutter with a receptacle for cigar-stumps; also, to combine a match-safe with the stump-receptacle, whereby a useful and handy article is produced that can be conveniently carried in the pocket.

The invention consists in the novel details of improvement and the combinations of parts that will be more fully hereinafter set forth, and then pointed out in the claim.

Reference is to be had to the accompanying drawings, forming a part of this specification, wherein—

Figure 1 is a side elevation of our device shown in the open position. Fig. 2 is a longitudinal central section of the same closed; and Fig. 3 is a longitudinal sectional view showing a different arrangement.

In the accompanying drawings, our device A represented in substantially the shape of a cigar, said device being substantially hollow, like a casing or box, as shown in Figs. 2 and 3. Said cigar-shaped device or casing may be made of thin metal, if desired, or of any suitable material and shape. Said casing A is shown divided into two compartments B D, that extend in line with each other, the compartment B being long and narrow and open at its larger end, thereby forming a receptacle to receive partly-burned cigars-stumps E, &c., the compartment D forming a safe or receptacle for matches. The stump and match receptacles B D are preferably hinged together, as at *a*, so they can be opened to assume the position shown in Figs. 1 and 3, and and they can be held closed, as in Fig. 2, by a catch *b*, Fig. 1, or by any other suitable means; but the parts B D can be otherwise connected together, if desired, so as to extend in line with each other, whereby they are so separated that the heat of the partly-burned cigar-stump will not ignite the matches in the receptacle D.

We prefer to provide the stump-receptacle B with apertures *d* to permit the escape of gases, &c. In Figs. 1 and 2 the inner or open end of the match receptacle or safe D is provided with a partition or cover F, which may be hinged or otherwise suitably connected to said safe or receptacle to permit ready access to the matches, and also to prevent the matches passing into the stump-receptacle or the cigar-stump and matches becoming mixed, and thereby ignited, the one cover serving to cover both receptacles B D.

By the above arrangement we produce a simple, compact, and useful article which, being long and narrow, can be carried in the pocket like a cigar, and also closely resemble a cigar.

In order that a tip can be readily cut from a cigar, we secure to the match safe or receptacle D a suitable knife G, which enters the receptacle B when the parts are closed, as in Fig. 2. The receptacle B is provided with an aperture *e* for the reception of a cigar-tip, said aperture corresponding with the knife G, so that said knife can cut off the tip of the cigar when it is passed into the aperture *e*.

To cut off the tip of the cigar, the long narrow receptacle B is first swung outward, as in Fig. 1, and the tip then passed into the aperture *e*. The receptacle B is then swung back to the closed position, Fig. 2, which causes the tip to be forced against the knife, and thus severed from the cigar.

It is evident that the knife or cutter G can be variously arranged, if desired. While in Fig. 1 the knife is on the match-safe D and the aperture *e* is in the receptacle B, in Fig. 3 the knife or cutter is on the receptacle B and the aperture *e* is in the match-safe. In Fig. 3, also, the cover F for the match-safe is on the outer end of the safe D (or the butt-end of the cigar-shaped device A.) With this latter arrangement we provide the match-safe with an internal shelf or partition *f*, which keeps the matches separate from the stump-receptacle B and also keeps the tips from reaching the matches.

By our improvements we produce a complete device, consisting of three articles in one—viz., a match-safe, a cigar-stump-receptacle, and cigar-tip cutter.

By making the device in the shape of a cigar it can be readily carried in the pocket, is easily handled, and readily operated to cut a cigar-tip, and the two receptacles held at such a distance apart that the heated cigar-stump will not ignite the matches in the safe or receptacle D.

Of course the stump-receptacle could carry the cover F, if desired, and the knife or cutter G can be of any desired shape and construction, whether it is rigidly secured to the receptacle or not.

We are aware of the patent to Graetz, No. 85,170, December 22, 1868; but in said patent the match-box is carried at the side of the cigar-holder, and in said device the heat from a hot cigar-stump is communicated to the matches that lie close to the side of the holder, and they will become ignited or affected; but in our device the two receptacles are so arranged that the matches will not be affected by the heat from a cigar-stump.

Having now described our invention, what we claim, is—

The cigar-stump receptacle, match-box, and cutter herein described, consisting of the receptacles B D, the inner end of the receptacle B being open, the removable partition on the receptacle D, for separating the contents of said receptacles, the knife carried by the receptacle D, the receptacle B, having an aperture for the escape of smoke and gases, and an aperture $e$ to correspond with the knife for cutting off cigar-tips, substantially as described.

WILLIAM F. SMITH, JR.
GEORGE C. SMITH.

Witnesses:
JAMES M. TULLY,
T. F. BOURNE.